United States Patent

[11] 3,581,239

[72] Inventor William J. Knutson
Chicago, Ill.
[21] Appl. No. 804,496
[22] Filed Mar. 5, 1969
[45] Patented May 25, 1971
[73] Assignee Motorola, Inc.
Franklin Park, Ill.

[54] FREQUENCY MODULATED CRYSTAL CONTROLLED OSCILLATOR OPERABLE AT A PLURALITY OF TEMPERATURE COMPENSATED CENTER FREQUENCIES
6 Claims, 1 Drawing Fig.

[52] U.S. Cl. ........................................................ 332/18, 307/310, 307/320, 331/36, 331/49, 331/70, 331/116, 331/161, 332/26, 332/30
[51] Int. Cl. ........................................................ H03b 5/32, H03c 3/20, H03c 3/28
[50] Field of Search ............................................ 332/26, 30 V, 19, 18; 331/48, 49, 56, 160, 161, 177 V, 36 C, 176, 116, 70; 334/15; 307/310, 320

[56] References Cited
UNITED STATES PATENTS

| | | | |
|---|---|---|---|
| 2,163,742 | 6/1939 | Wolfskill | 331/160 |
| 2,925,563 | 2/1960 | Firestone | 332/26 |
| 3,154,753 | 10/1964 | Rusy | 332/26 |
| 3,227,968 | 1/1966 | Brounley | 331/177(V)X |
| 3,324,415 | 6/1967 | Sheffet | 332/26 |
| 3,349,348 | 10/1967 | Ice | 331/116X |
| 3,428,916 | 2/1969 | Horenga et al. | 331/177(V)X |
| 3,296,550 | 1/1967 | Hukami et al. | 331/49 |

*Primary Examiner*—Alfred L. Brody
*Attorney*—Mueller & Aichele

ABSTRACT: A frequency modulated, solid state, crystal controlled oscillator, including a voltage variable capacitor, for use in portable transmitters wherein it is desired to operate at a plurality of center frequencies that are stable with temperature change. Any one of a plurality of center frequency determining circuits, each including a crystal operating in its parallel resonant mode, can be selected to determine a desired center frequency. Each crystal is connected in parallel with a temperature compensating network. The biasing point of the voltage variable capacitor, the net inductance of a circuit which applies the modulating voltage thereto are selected to cause the nonlinear characteristics of the crystal and voltage variable capacitor to counterbalance each other so that linear modulation is attained.

PATENTED MAY 25 1971 3,581,239
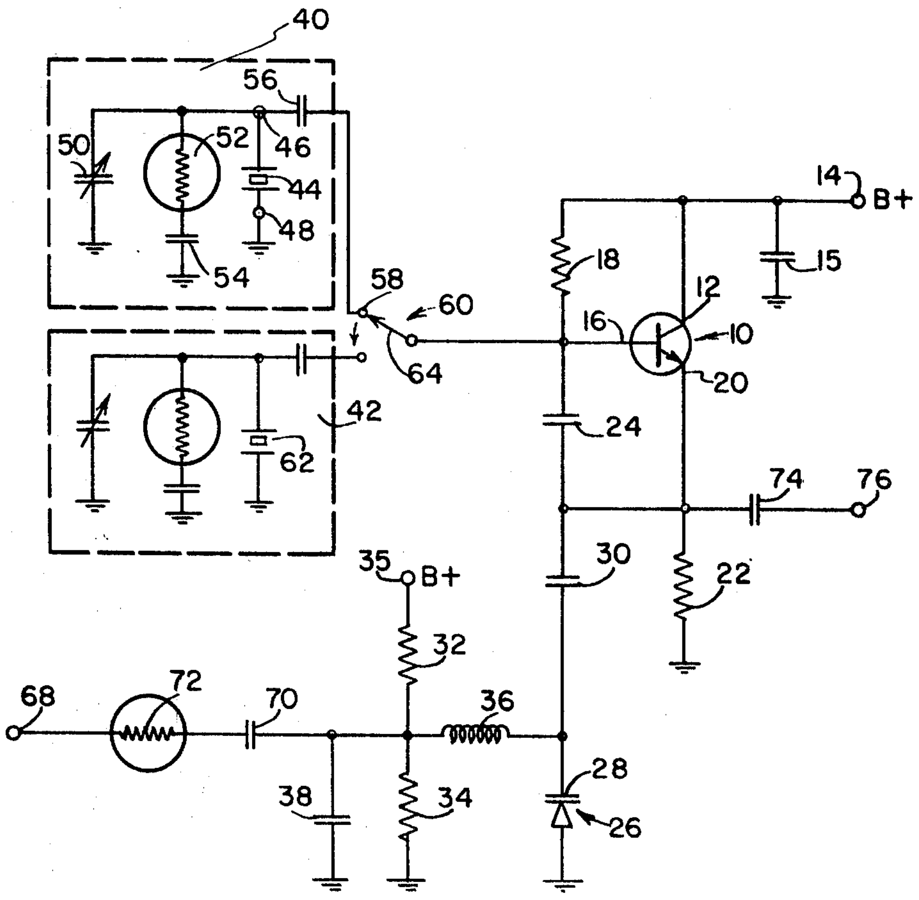
Inventor
WILLIAM J. KNUTSON
BY
Mueller, Aichele & Rauner
Attys.

FREQUENCY MODULATED CRYSTAL CONTROLLED OSCILLATOR OPERABLE AT A PLURALITY OF TEMPERATURE COMPENSATED CENTER FREQUENCIES

BACKGROUND OF THE INVENTION

Because of a continual increase in the number of frequency modulated (FM) transmitters operating on different center frequencies within specified frequency bands, there is an increasing necessity for the center frequency of each transmitter to be held within predetermined limits so that transmissions on adjacent channels do not interfere with each other. As a result, piezoelectric crystals have been utilized in the center frequency determining circuits of the oscillators included within both fixed base and portable FM transmitters for the purpose of providing substantially constant center frequencies of oscillation. The electrical properties of the crystals and thus the center frequencies, however, vary with changes in temperature. To solve this problem the crystals in these transmitters have been enclosed by constant temperature ovens so that they are not exposed to the changing temperatures.

Attempts have been recently made to design a solid state, portable, FM transmitter which includes a directly modulated solid state oscillator with a crystal for determining a stable center frequency of oscillation. A voltage variable capacitor or varactor has been connected with the crystal for providing a frequency deviation about the center frequency, corresponding to the amplitude changes of a modulating voltage impressed across the varactor. Since the capacitance of the varactor is a nonlinear function of the amplitude of the modulating voltage applied thereto, and since the frequency of oscillation as controlled by the crystal is a nonlinear function of the varactor capacitance coupled therewith, it is difficult to vary or deviate the frequency of oscillation in an essentially linear fashion with the amplitude variations of the modulating voltage. Also, inasmuch as a portable transmitter must be small in size and operate from a battery having a limited power delivery capacity, it is impractical to use an oven for providing the frequency stability of the crystal with changes in ambient temperature. Furthermore, the configurations of prior art solid state, FM crystal oscillators are not readily adaptable for use with a plurality of crystals to provide oscillation on each of a plurality of center frequencies so that transmissions can be made on any one of a number of preselected channels.

SUMMARY OF THE INVENTION

It is an object of the present invention to provide a reliable, frequency modulated, crystal controlled oscillator formed by a simple, compact and inexpensive circuit.

Another object of the invention is to provide a frequency modulated crystal controlled oscillator which provides operation on each of a plurality of easily selected center frequencies.

Still another object of the invention is to provide a frequency modulated, crystal oscillator which includes a voltage variable capacitor as the frequency varying device, and which provides a frequency that varies with the amplitude of a modulating voltage in an essentially linear manner.

A further object of the invention is to provide a directly modulated, crystal controlled oscillator having selectively connected portions for providing a plurality of center frequencies, each of which is relatively stable over a range of temperatures.

The frequency modulated oscillator circuit of the invention includes a transistor for sustaining oscillation whose base is connected to the selector arm of a rotary switch for making contact to any one of a plurality of crystal networks which enable oscillation on any one of a plurality of selected center frequencies. Each of these networks includes a crystal with one terminal coupled through a coupling capacitor to a contact of the rotary switch. The crystals are manufactured to operate in their parallel resonant modes and thereby present predetermined equivalent inductances at their preselected frequencies. Each crystal is connected in parallel with the series combination of a thermistor or temperature variable resistor and a compensating capacitor, which are in parallel with a variable, center frequency adjusting capacitor. The emitter of the transistor is coupled to the cathode of a varactor diode or voltage variable capacitor. A linearizing inductor connects the varactor's cathode to a modulating capacitor across which the modulating voltage is developed. The combination of the linearizing inductor and modulating capacitor form a net linearizing inductance across the varactor at the frequency of oscillation. The varactor is biased from a regulated DC voltage source to have a quiescent capacitance which along with other capacitances electrically present across the terminals of the crystal, forms a correlation capacitance that cooperates with the equivalent inductance of the crystal to provide a parallel resonant circuit for determining the selected center frequency of oscillation. As the capacitance of the varactor is deviated by the modulating voltage, the correlation capacitance likewise is deviated to vary the frequency of oscillation. The quiescent operating point of the varactor and the value of the net linearizing inductance connected thereto are chosen so that the constant temperature frequency of oscillation varies substantially linearly with the amplitude of the modulating voltage. As the temperature decreases, the equivalent inductance of the crystal increases thus tending to lower the frequency of oscillation; however, the resistance of the thermistor, which is thermally connected to the crystal, increases thereby proportionately isolating the compensating capacitor from contributing to the correlation capacitance across the crystal. This lowers the value of the correlation capacitance thus tending to raise the frequency of oscillation thereby compensating for the temperature caused change in the equivalent inductance of the crystal. Alternatively, when the temperature of the crystal increases, the reverse effect occurs to again stabilize the frequency of oscillation.

When the temperature decreases and the compensating capacitor is partially isolated from adding to the correlation capacitance, the varactor capacitance becomes a greater portion of the correlation capacitance; and, as a result, the deviation of the frequency of oscillation for a modulating voltage of a given amplitude tends to increase thus increasing the deviation sensitivity of the modulator and resulting in a nonlinear frequency deviation with temperature. To compensate for this undesirable effect, another thermistor having a negative temperature coefficient is connected in the circuit applying the modulating voltage to the varactor. The resistance of this thermistor increases with a decrease in temperature thereby decreasing the amplitude of the modulating voltage applied across the varactor and, consequently, decreasing the change in varactor capacitance to compensate for the increased modulation sensitivity thus linearizing the modulation.

BRIEF DESCRIPTION OF THE DRAWING

The single FIGURE of the drawing illustrates the frequency modulated crystal oscillator of the invention.

DETAILED DESCRIPTION OF THE PREFERRED EMBODIMENT

The circuit of the invention includes a transistor 10 having its collector 12 directly connected to a DC power supply terminal 14 which provides a bias voltage having a regulated amplitude. Capacitor 15 provides an RF ground at collector 12 thereby isolating the regulated power supply from the oscillator signal. Transistor base 16 is coupled to power supply terminal 14 through bias resistor 18, and its emitter 20 is coupled to a ground or a reference potential through bias resistor 22 to provide a DC return path for the bias current. Resistor 22 also provides the alternating voltage that is fed back through capacitor 24, which is connected from emitter 20 to base 16, for sustaining oscillation. Bias resistors 18 and 22 are selected to initially cause Class A operation of the transistor so that oscillations immediately start with the application of the biasing voltage from terminal 14; however, once oscillation has begun transistor 10 is self-biased into Class C operation.

The frequency determining circuit of the oscillator includes varactor 26 in the emitter circuit of transistor 10. The cathode 28 of the varactor is connected through capacitor 30 to emitter 20. A voltage divider comprised of varactor biasing resistors 32 and 34 apply a selected portion of the regulated DC bias potential at power supply terminal 35 through inductor 36 and across modulation capacitor 38 to establish a quiescent reverse bias on varactor 26 which in turn provides a corresponding quiescent or steady state capacitance. Capacitor 38 and inductor 36 form a linearizing inductive reactance at the frequency of oscillation which cooperates with the varactor capacitance to provide a net capacitive reactance.

The frequency determining circuit also includes a plurality of crystal circuits 40 and 42 for providing a plurality of selected center frequencies. Crystal circuit 40 includes piezoelectric crystal 44 having terminals 46 and 48. Crystal terminal 48 is connected to ground to facilitate the switching of the crystal into the frequency determining circuit. Crystal 44 is connected in parallel with both capacitor 50, which is adjustable to calibrate or warp the center frequency of oscillation, and with the series combination of thermistor or temperature variable resistor 52 and compensating capacitor 54. Crystal terminal 46 is coupled through capacitor 56 to contact 58 of rotary switch 60. Crystal circuit 42 has the same configuration as crystal circuit 40; however, crystal 62 has been constructed to operate at a different frequency than crystal 48. By rotating wiper 64 of rotary switch 60, either of the crystal circuits shown in the FIGURE, or still other crystal circuits, can be selectively connected to base 16 of transistor 10.

When one of these frequency determining circuits has been selected, the crystal, which is constructed to operate in its parallel resonant mode to represent an equivalent inductance, forms a parallel resonant circuit with a correlation capacitance that includes all of the capacitance electrically present across the crystal's terminals. This parallel resonant circuit determines the center frequency of oscillation. When the selector switch is in the position shown in the FIGURE the correlation capacitance depends on the capacitance formed by warping capacitor 50, compensating capacitor 54 in cooperation with the resistance of thermistor 52, capacitances 56, 24, 30 and the net capacitance of the combination of varactor 26, inductor 36 and capacitor 38.

MOdulation signal input terminal 68 is connected through thermistor 72 to capacitor 70 which is coupled to capacitor 38. A modulating signal applied to terminal 68 is coupled through thermistor 72 and capacitor 70 to be developed across capacitor 38 and applied by inductor 36 to varactor 26. Since the amplitude of the modulating signal either adds to or subtracts from the bias voltage across varactor 26, the capacitance of varactor 26 is varied about its quiescent value which in turn changes the correlation capacitance across the crystal to deviate the frequency of oscillation thus providing frequency modulation for application by capacitor 74 to a suitable load connected to output terminal 76. At the frequency of oscillation capacitor 38 essentially provides a short circuit to ground thus isolating the audio circuitry from the oscillator.

In order that the modulating signal can be retrieved from the carrier signal by an FM receiver it is essential that the oscillator frequency appearing at output 76 vary as a linear function of the amplitude of the modulating signal applied at terminal 68. The capacitance of varactor 26 varies approximately inversely with the square root of the amplitude of the modulating voltage impressed thereacross. The equivalent inductances of the selected crystal is a nonlinear function of its correlation capacitance which, in the preferred embodiment, varies directly with capacitance of varactor 26. If varactor 26 is selectively biased and if the combination of inductor 36 and capacitor 38 is properly chosen the nonlinear inductance characteristic of the crystal cooperates with the nonlinear composite characteristic of the varactor, inductor and capacitor to provide a linear frequency deviation with a change in modulation voltage amplitude.

When the temperature of a selected crystal such as crystal 44 decreases, its equivalent inductance increases tending to decrease the center frequency of oscillation. Alternatively, the resistance of thermistor 52, which is thermally connected to crystal 44, increases to proportionally isolate compensating capacitor 54 from contributing to the correlation capacitance thereby tending to increase the center frequency of oscillation. The net result of the increase in inductance and corresponding decrease in correlation capacitance is that the center frequency of oscillation does not change with the decrease in temperature. On the other hand, when the temperature of crystal 44 increases its equivalent inductance decreases, but the resistance of thermistor 52 correspondingly decreases to increase the correlation capacitance. The net result is that the center frequency of oscillation again remains constant with an increase in temperature. Thus the center frequency of oscillation is held constant, or is stabilized, over a range of temperatures without using the power and space consuming, constant temperature ovens of the prior art. For purposes of the foregoing explanation it has been assumed that the crystal has a positive temperature coefficient and that the thermistor has a negative temperature coefficient; however, the temperature coefficients could be reversed and the center frequency would still tend to be stabilized.

A problem, however, results from the change in correlation capacitance with temperature which, in turn, results from the change in relative isolation of the compensating capacitor with temperature. For instance, when the effect of compensating capacitor 54 decreases, because the resistance of thermistor 52 has increased with a decrease in temperature, the portion of the correlation capacitance contributed by varactor 26 increases. Therefore, a given change in capacitance of varactor 26 corresponding to a given change in amplitude of the modulating voltage at input 68 would tend to cause a greater frequency deviation of the output signal at terminal 76 than it would for a higher temperature. Thus the deviation sensitivity tends to vary with temperature resulting in a nonlinear frequency deviation. To compensate for this undesirable condition, negative temperature coefficient thermistor 72 has been included in the circuit applying the modulating voltage to varactor 26. When the temperature decreases and varactor 26 becomes a correspondingly greater portion of the correlation capacitance, the resistance of thermistor 72 increases to correspondingly decrease the amplitude of the modulating voltage applied across the varactor 26 and accordingly decrease the capacitance of the varactor. This action stabilizes the frequency deviation so that it changes linearly for a given change in modulating voltage amplitude even with varying temperature.

In a circuit which has been found to be satisfactory for commercial use for operating with both B+ bias supply voltages regulated at 6.5 volts on frequencies from 16.0 MHz. to 18.0 MHz., the components have the following descriptions.

| | |
|---|---|
| Transistor 10 | Motorola M9444 |
| Capacitor 15 | 5500 pf. |
| Resistor 18 | 56 K ohms |
| Resistor 22 | 2.2 K Ohms |
| Capacitor 24 | 150 pf. N1400 |
| Varactor 26 | Motorola MV1644 ±5% |
| Capacitor 30 | 470 pf. Y5D |
| Resistor 32 | 470 K ohms |
| Resistor 34 | 820 K ohms |
| Inductor 36 | 2.6 mh. ±5% |
| Capacitor 38 | 470 pf. Y5D |
| Crystal 44, 62 | Motorola NLE 6032A |
| Variable capacitor 50 | 2.5 to 9 pf. |
| Thermistor 52 | Motorola NLE 6032A |
| Capacitor 54 | Motorola NLE 6032A |
| Capacitor 56 | 40 pf. N220 |
| Capacitor 70 | 0.15 mfd. |
| Thermistor 72 | 246 ohms ±10% @ 25° C. |
| Capacitor 74 | 40 pf. N150 |

What has been described, therefore, is a simple, solid state, crystal controlled FM oscillator having a unique configuration for use in portable equipment subject to temperature variations. The configuration lends itself to operation with any one of a plurality of crystal networks for determining anyone of a plurality of selected center frequencies of oscillation. The linearizing inductance and the biasing of the varactor are selected so as to provide linear frequency modulation. Each crystal is provided with a thermistor which selectively changes the amount of correlation capacitance thereacross to provide a temperature stable center frequency. The change in deviation sensitivity which results from the temperature compensation of the center frequency is corrected by a thermistor included in the circuit applying the modulating voltage.

I claim:

1. A frequency determining circuit facilitating the generation of any one of a plurality of selected center frequencies by a frequency modulated oscillator having a single electron device with first, second and third electrodes which sustains oscillation at one of the selected center frequencies, such frequency determining circuit including in combination:

means providing a reference potential;

first circuit means providing an equivalent capacitance and having first capacitor means directly connected between the first and third electrodes of the electron device, second capacitor means having first and second plates with said first plate connected to the first electrode of the electron device, voltage variable capacitor means connected from said reference potential means to said second plate of said second capacitor means, inductor means and third capacitor means connected in series with each other across said voltage variable capacitor means;

switch means having a first terminal connected to the third electrode of the electron device, a plurality of second terminals and a switchable member for connecting said first terminal to any one of said second terminals;

a plurality of networks each including a piezoelectric element, means coupling each of said plurality of networks between one of said second terminals of said switch means and said reference potential means so that said switchable member connects a selected one of said piezoelectric elements to the third electrode of the electron device, each of said piezoelectric elements providing a value of inductance which resonates with said equivalent capacitance to provide a selected one of the different center frequencies when such piezoelectric element is connected by said switchable member of said switch means to said third electrode; and modulating voltage supply means providing a modulating signal across said third capacitor means and through said inductor means to said voltage variable capacitor means to change said equivalent capacitance thereof thus deviating said center frequency a predetermined amount in response to said modulating signal of a given amplitude.

2. The frequency determining circuit of claim 1 wherein said inductance of each of said piezoelectric elements changes with a change in temperature thereby tending to cause said center frequency of oscillation to change with temperature, and said frequency determining circuit further including, center frequency temperature compensating means having temperature variable resistor means and fourth capacitor means connected in series with each other across each of said piezoelectric elements, said temperature variable resistor means being responsive to said change in temperature to provide a proportional change in influence of said fourth capacitor means on said center frequency of oscillation to compensate for said tendency of said change in inductance to change said center frequency with temperature, said center frequency of oscillation thereby remaining essentially constant over a range of temperature change.

3. The combination of claim 2 wherein said change in influence of said fourth capacitor means on said center frequency of the oscillator with change in temperature results in a tendency for said predetermined amount of frequency deviation of said center frequency in response to said modulating signal of given amplitude to change, and wherein said modulating voltage supply means includes second temperature variable resistor means whose resistance changes with said change in temperature to thereby change the amplitude of said modulating signal being coupled to said voltage variable capacitor means, said change of amplitude of said modulating signal compensating for said tendency of said predetermined amount of frequency deviation to change with temperature thereby keeping said amount of frequency deviation substantially constant in response to said modulating voltage of given amplitude over said temperature range.

4. The combination of claim 1 wherein, said piezoelectric element, said voltage variable capacitor and said inductor are selected with characteristics such that the change in frequency of the frequency modulated oscillator varies substantially linearly with a change in amplitude of said modulating voltage.

5. The combination of claim 1 further including variable capacitor means connected across each of said piezoelectric elements, said variable capacitor means being adjustable to change the center frequency of oscillation of the oscillator.

6. The combination of claim 1 wherein said piezoelectric elements of said networks are quartz crystals having different frequencies of operation and which are operated in their antiresonant modes.